United States Patent [19]

Brooks et al.

[11] 4,159,947
[45] Jul. 3, 1979

[54] DEWATERING SYSTEM

[76] Inventors: Larry L. Brooks; David A. McMillon, both of P.O. Box 2323, Birmingham, Ala. 35201

[21] Appl. No.: 828,318

[22] Filed: Aug. 29, 1977

Related U.S. Application Data

[63] Continuation of Ser. No. 687,377, May 17, 1976, abandoned.

[51] Int. Cl.² .......................................... B01D 33/14
[52] U.S. Cl. ............................... 210/108; 100/112; 100/118; 100/151; 210/386; 210/393; 210/401
[58] Field of Search .................. 210/65, 77, 106, 108, 210/111, 400, 401, 406, 409, 411, 416, 391, 393, 386; 100/37, 112, 116, 118, 151-154

[56] References Cited

U.S. PATENT DOCUMENTS

| | | | |
|---|---|---|---|
| 1,874,972 | 8/1932 | Hall | 210/82 X |
| 2,451,073 | 10/1948 | Cowherd | 210/108 |
| 2,895,614 | 7/1959 | Komline | 210/106 X |
| 3,358,834 | 12/1967 | El-Hindi | 210/391 X |
| 3,428,177 | 2/1969 | Duff | 210/108 |
| 3,459,123 | 8/1969 | Begiebing | 100/118 |
| 3,477,583 | 11/1969 | Krynski et al. | 210/401 |
| 3,756,411 | 9/1973 | Kracklauer | 210/401 X |
| 3,797,384 | 3/1974 | Hoff | 100/154 |
| 3,896,030 | 7/1975 | Bähr | 210/401 X |
| 3,942,433 | 3/1976 | Wohlfarter | 100/118 |
| 3,951,809 | 4/1976 | Kollmar | 210/400 |
| 4,019,431 | 4/1977 | Bastgen | 210/386 X |
| 4,038,187 | 7/1977 | Saffran | 210/108 |

Primary Examiner—William A. Cuchlinski, Jr.
Attorney, Agent, or Firm—Jones, Thomas & Askew

[57] ABSTRACT

The dewatering system includes a first endless filter belt movable along its length through an upper run, then through an arc about a dewatering drum, and then through a lower return run in a sinuous path about a plurality of rollers. A flowable aqueous material or slurry, such as sludge, is deposited on the upper surface of the belt as it moves along its upper run. A subatmospheric pressure is applied to the lower surface of the upper run of the first belt to induce the liquid to drain from the sludge. A second endless filter belt is movable into sandwiched relationship with the first belt about the sludge and moves with the first belt about the dewatering drum and about the plurality of rollers in the sinuous path of the return run. One or more high tension endless belts are movable about the sandwiched first and second belts and material and some of the rollers in the return run, and tension is applied to the high tension belts to squeeze the first and second belts and the material as they move about the rollers in the sinuous path and to extract the liquid from the material.

11 Claims, 3 Drawing Figures

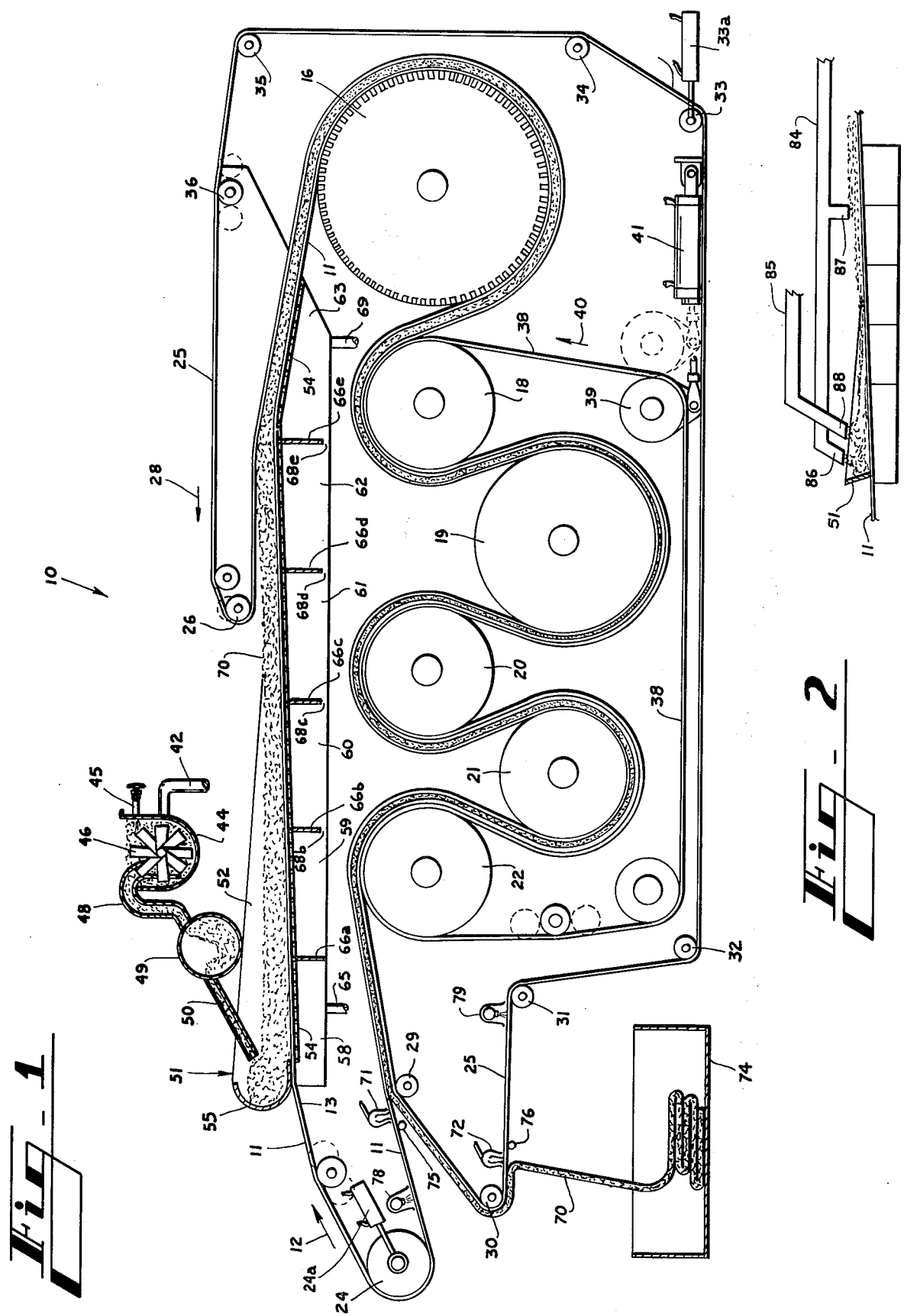

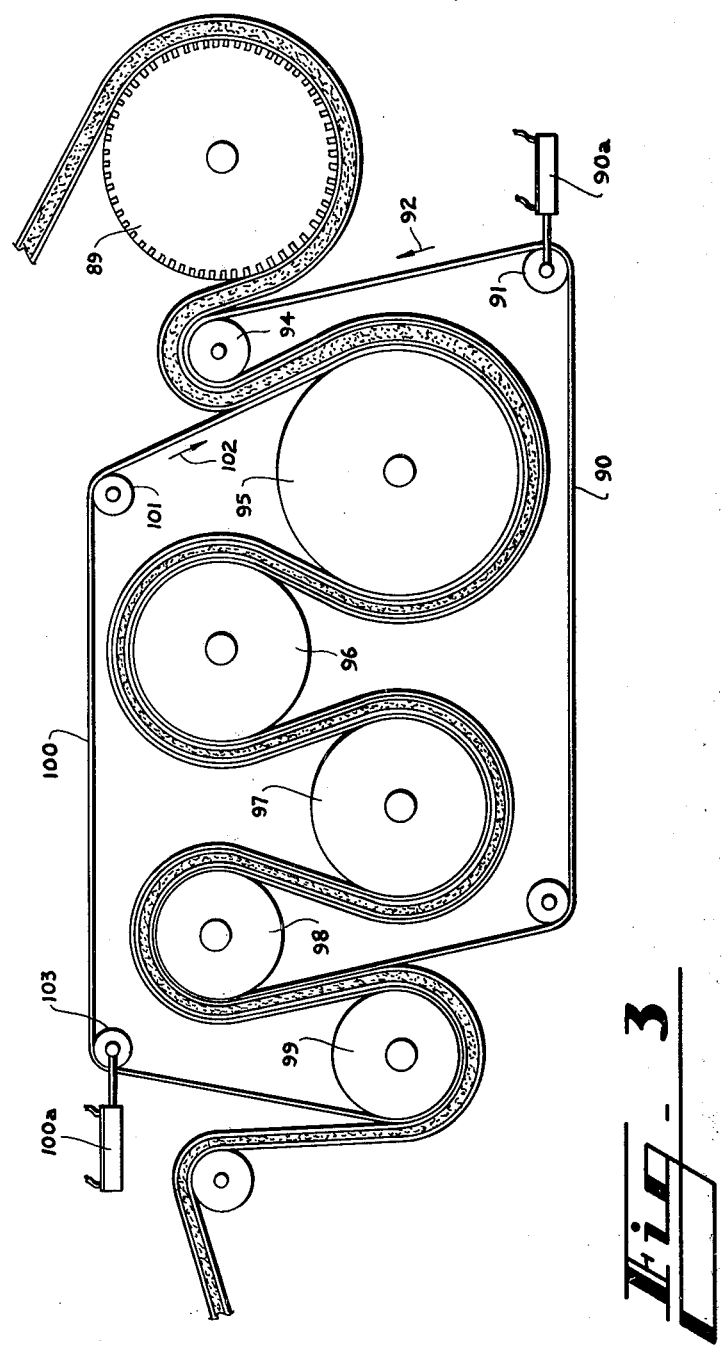

DEWATERING SYSTEM

CROSS-REFERENCE TO RELATED APPLICATION

This is a continuation of application Ser. No. 687,377, filed May 17, 1976, now abandoned.

BACKGROUND OF THE INVENTION

This invention relates to liquid purification and separation, for example to the dewatering of a slurry or the like from sewage treatment plants, where a flocculation compound is mixed with a slurry. The solids of the mixture are filtered from the liquids of the mixture, and a relatively dry sludge cake is discharged from the system.

It is desirable to dewater slurries in various manufacturing processes so as to recapture and use the solids and to dispose of the water in an uncontaminated condition. For example, in the disposal of sewage, a sludge slurry is removed from settling tanks of sewage treatment plants which contains both solids and liquid, with a substantial amount of solids suspended in the liquid. One common procedure for treating sludge is to add a flocculation compound as a filter aid to the sludge to free the trapped liquid and filter the solids from the liquid. The flocculants are added to the slurry for increasing the filterability of the slurry and for coagulating the solids, therefore reducing the tendency of the small solids from passing with the liquid through the filter medium. Even after flocculation of the sludge mixture some of the solids are so small and the quantity of liquid so great that the smaller solids tend to move from the mixture with the liquid through the filter medium if the liquid is urged too vigorously from the mixture. This condition requires that the sludge be carefully handled and gently dewatered.

In the past, several sludge dewatering systems have been developed which comprise pairs of moving conveyor belts usually fabricated from woven textile material that function as filters. The prior art systems deposit coagulated sludge on one moving belt, and as the sludge moves with the first moving belt the second moving belt is moved down into contact with the sludge so as to squeeze and therefore dewater the sludge. Examples of such prior art systems are disclosed in U.S. Pat. Nos. 3,800,952, 3,601,039, 3,699,881, and 3,896,030.

In a sewage treating process it is desirable to process as much sludge as possible in a short period of time, to extract as much liquid as possible from the sludge during the process to produce a dry sludge cake, and to capture a high percentage of the solids from the original slurry. These three objectives are in conflict with each other since more water can be extracted from sludge if the sludge is given more time to drain. Although the dewatering capacity of a dewatering system can be increased by merely speeding up the system, the increase in speed also usually causes a lower percent of solids to be filtered from the liquid and the sludge is not squeezed for a time long enough to remove the desired amount of liquid. When the draining of the sludge is assisted by squeezing the sludge between sandwiched endless conveyor belts, the smaller sludge particles tend to pass through the conveyor belts. Also, if the sandwiched conveyor belts are run through a sinuous path so as to create shear forces in the sludge filter cake, the shifting of the filter cake tends to break the filter cake and allow some of the finer solids to pass with the liquid through the filter belts. On the other hand, after a high percentage of the liquid has been removed from the sludge cake, the sludge cake can be squeezed and higher compression forces can be applied to the sludge cake to remove more liquid substantially without hazard of allowing the small solid particles to pass through the filter belt, since the reduced quantity of water present in the sludge cake is insufficient to wash out the small particles.

Once the sludge has been dewatered, it is desirable to remove the sludge from the pores of the filter belts, so that a porous belt is available on the next cycle of the belt for receiving the sludge slurry. The cleaning of the filter belts is usually accomplished by directing a continuous flow of water against the belt, and requires the excessive use of water.

Dewatered sludge can be used for various purposes, such as for a landfill as a fertilizer, or as a fuel. If the dewatered sludge has a low liquid content, it weighs less for a given volume, which means that it can be transported at a lower cost, and the dry product can be better used in subsequent processes since the energy required to extract the residual water would be less and the dryer the sludge, the better the sludge sustains combustion. Also, a dryer sludge makes a better landfill.

SUMMARY OF THE INVENTION

Briefly described, the present invention comprises a dewatering system for removing water from flowable aqueous material, such as a slurry or sludge wherein a flocculating agent is added to a slurry if necessary, the mixture is deposited as a slurry on an endless porous filter belt movable along its length through an upper run over a plurality of vacuum chambers and then into sandwiched relationship with respect to a second endless porous filter belt. The belts and their intermediate layer of the slurry are passed about an arc of a dewatering drum, and then in a sinuous path about a plurality of rollers in a return run. One or more high tension belts are moved into contact with the first and second filter belts and moved through the sinuous path about the plurality of rollers. Tension is applied to the high tension belts so that additional squeezing forces are applied to the layer of the slurry as the slurry passes about the plurality of rollers.

Thus, it is an object of the present invention to provide a dewatering system for dewatering a flowable aqueous material or the like wherein the material has a large percentage of the liquid extracted therefrom with the loss of a minimum amount of solids from the material with the liquid.

Another object of this invention is to provide a dewatering system for sludge or the like which is inexpensive to construct and maintain and which functions rapidly to extract liquid from sludge and provide a sludge cake that contains a low percentage of liquid.

Other objects, features and advantages of the present invention will become apparent upon reading the following specification, when taken in conjunction with the accompanying drawings.

BRIEF DESCRIPTION OF THE DRAWINGS

FIG. 1 is a schematic side elevational view of the dewatering system.

FIG. 2 is a schematic side elevational view of a modified feed section of the dewatering system.

FIG. 3 is a partial schematic side elevational view of a modified form of the invention.

DETAILED DESCRIPTION

Referring now in more detail to the drawing, a dewatering system 10 comprises a support framework and an external housing (not shown). The first porous endless conveyor belt 11 is movable in the direction indicated by arrow 12 along an upper flight or run 13 over a grate assembly 54 to the upper tangent of rotatable dewatering drum 16, then through an arc about the dewatering drum 16 to begin its lower return flight or run in a sinuous path over the upper and lower surfaces of a plurality of rollers 18, 19, 20, 21 and 22. After the first conveyor belt leaves the last of the rollers 22 it moves back around the guide roll 24 to begin its upper run again.

A second porous endless conveyor belt 25 moves about guide roll 26 in the direction indicated by arrow 28 so as to run concurrently with the first belt 11, and the second belt 25 moves with the first belt about the dewatering drum 16 and through the sinuous return run from the dewatering drum 16 about the rollers 18, 19, 20, 21 and 22. The second belt 25 moves about a plurality of guide rolls 29, 30, 31, 32, 33, 34, 35, and 36 back to the first guide roll 26. The position of guide roll 24 is regulated by fluid actuated ram 24a and applies tension to conveyor belt 11, and the position of guide roller 33 is regulated by fluid actuated ram 33a and applies tension to conveyor belt 25. The tension in belts 11 and 25 is therefore maintained proportional to the force applied by the rams 24a and 33a substantially without regard to belt stretching, the increase or decrease in the load handled by the system or to other variables.

A third endless belt 38 moves from its guide roll 39 in an upward direction as indicated by arrow 40 toward roller 18 and then moves with the first and second filter belts 11 and 25 about rollers 18, 19, 20, 21 and 22. It will be noted that the endless belt 40 moves beneath the filter belts 11 and 25 as it moves about rollers 18, 20, and 22, but passes on the outside of the filter belts 11 and 25 as it moves about rollers 19 and 21.

The first and second porous endless conveyor belts 11 and 25 are woven textile belts and function as filters, while the endless belt 38 is a woven steel, high tension belt. Tension is applied to the third belt 40 by one or more hydraulic rams 41 (only one illustrated) which is connected to the ends of roller 39 and which functions to move the roller 39 between the solid line and broken line positions. The amount of tension applied to the belt 40 as well as to belts 11 and 25 is regulated by a pump and pressure actuated bypass valve in the circuit (not shown) that applies hydraulic pressure to the rams 24a, 33a and 41. The belt 40 is usually operated with a tension force range of approximately from 2,000 to 5,000 pounds per foot of belt width, while the belts 11 and 25 both are operated with a tension force range of approximately 10 to 250 pounds per foot of belt width.

Conduit 42 supplies slurry or sludge 70 or other flowable aqueous material to a mixing chamber 44. Conduit 45 directs a flocculant or another filter aid to the same mixing chamber 44, and these materials are mixed together as by rotating paddles 46 in the mixing chamber 44. The mixture is moved from the mixing chamber 44 through a conduit 48 to a spreading chamber 49, and from the spreading chamber 49 downwardly across an inclined chute 50 to the upper run of the first conveyor belt 11. By the time the sludge has moved from the mixing chamber 44 to the spreading chamber 49 and then down the chute 50 to the upper run of the first conveyor belt 11 flocculation of the sludge will have occurred to a substantial extent so that the solids will be held in suspension in the sludge on the conveyor belt.

Sludge distribution pan 51 is located along the upper run of the first conveyor belt 11 and includes upstanding side guides 52 on opposite sides of the conveyor belt and an open grate 54 beneath the run of the conveyor belt. The upstream end of the sludge distribution pan includes an end wall 55 to keep the sludge from moving beyond the entrance end of the sludge distribution pan. The bottom surface of the sludge distribution pan is formed by the moving belt 11 which is supported by and movable over the grate assembly 54 and the belt 11 and grate assembly 54 are inclined upwardly along the direction of movement of the belt. The section of the system over the upper run of the first conveyor belt at the sludge distribution pan 51 is considered as the sludge feed section, and the sludge distribution pan 51, mixing chamber 44, distribution chamber 49 and their related elements function as means for feeding the sludge 70 onto the upper run of the first conveyor belt.

A plurality of chambers 58, 59, 60, 61, 62, and 63 are formed by sheet metal material below the upper run of a first conveyor belt, and each chamber is in open communication at its upper portion through the grate assembly with the upper run of the porous conveyor belt. The first chamber 58 includes an open drain conduit 65 which allows liquid falling into the chamber from the sludge moving on the upper conveyor belt to pass at atmospheric pressure through the chamber and through the open drain conduit 65.

Chambers 58–63 are divided from each other by separator walls 66a–66e. Weir openings 68b–68e are formed at the lower portion of each of the separator walls 66b–66e, so that each chamber 59–63 is in communication with each other through these openings. Chamber 63 includes one or more drain conduits 69 which are connected to the inlet of a pump and a blower (not shown) which function to draw fluid and air from chambers 59–63. When liquid is present in any of the chambers 59–62 to a depth sufficient to cover the openings 68b–68e, the sub-atmospheric vacuum drawn by the blower will pull the liquid through the openings 68b–68e into the next adjacent chamber on toward the exhaust conduit 69. If the level of the liquid in the chamber is insufficient to cover the opening at the bottoms of the chambers, then the gas present in the chambers will move through the openings to the next adjacent chambers and eventually out of the exhaust conduit 69. The openings 68b–68e are adjustable in size (not shown) to adjust the amount of subatmospheric pressure applied to the chambers 59–63.

The sizes of the openings 68b–68e which are variable are usually adjusted so that when a sub-atmospheric pressure is created in chamber 63 by the exhaustion of the fluid therefrom through exhaust conduit 69, the sub-atmospheric pressure in chamber 63 will be lower than the sub-atmospheric pressures in the preceding chambers. This same relationship exists progressively back through each of the chambers 62, 61, 60 and 59, so that progressively lower sub-atmospheric pressures are applied to the lower surface of the upper run of the first conveyor belt 11 by the chambers 59–63. Thus, the section of the system where the first conveyor belt 11 passes over the chambers 59–63 where vacuum is applied to the lower surface of the conveyor belt comprises a vacuum dewatering section.

The upper run of first conveyor belt 11 extends up an incline as it moves over most of the chambers 58–63 and then moves through a downward incline into tangential relationship with the periphery of dewatering drum 16. The second conveyor belt 25 moves about the movable guide roll 26 and into contact with the sludge 70 as the sludge and first conveyor belt 11 approach the upper end of their upwardly inclined movement, and then bend with the sludge and first conveyor belt and move toward the periphery of the dewatering drum.

Dewatering drum 16 has a plurality of herringbone grooves defined in its exterior annular surface so that the water passing through the first conveyor belt 11 can enter the herringbone grooves and run to the side edges of the dewatering drum. The first conveyor belt 11 and second conveyor belt 25 move in sandwiched relationship about the layer of sludge 70 and carry the sludge about the dewatering drum and then about the rollers 18–22. The tension applied to the first and second conveyor belts 11 and 25 usually is between 25–50 pounds per foot across the width of the belt, so that as the belts move in sandwiched relationship about the layer of sludge 70 and travel about the dewatering drum 16, a slight squeezing force is applied to the layer of sludge by the tension applied to the second conveyor belt 25, causing liquid to pass through the weave of the first and second conveyor belts. In the embodiment illustrated, the diameter of dewatering drum 16 is 36 inches, and the belts 11 and 25 extend about an arc of approximately 250° of dewatering drum 16. The length of the belts in contact with the dewatering drum is approximately 6.5 feet and the squeezing pressure applied to the sludge as the sludge travels about the dewatering drum is between approximately 3.8 and 7.7 pounds per square foot. Thus, the section of the system where the first and second conveyor belts pass about the dewatering drum 16 comprises a low pressure dewatering section.

The tension in first and second conveyor belts 11 and 25 also function to squeeze the layer of sludge as the sludge passes about the peripheries of rollers 18, 19, 20, 21 and 22. In the embodiment illustrated in FIG. 1, rollers 18, 20, and 22 are 1 foot in diameter and the belts 11 and 25 contact approximately 180° arc and 1.5 feet in length about roller 18, approximately 220° arc and 1.9 feet in length about roller 20 and approximately 150° and 1.3 feet in length about roller 22, therefore exerting squeeze pressures between approximately 16 and 33 pounds per square foot about roller 18, between 13 and 26 pounds per square foot about rollers 20 and between about 19 and 38 pounds per square foot about roller 22.

When third conveyor belt 38 moves about the upper rollers 18, 20 and 22, it moves into contact with the surface of the rollers and does not function to apply squeezing forces to the layer of sludge, but when the third conveyor belt 38 moves about the lower surfaces of rollers 19 and 21, the belt is positioned outside the first and second conveyor belts and the layer of sludge, and the tension applied to the third conveyor belt 38 therefore functions to exert a squeezing force to the layer of sludge as the layer of sludge passes about the lower peripheries of rollers 19 and 21. Since roller 19 has a larger diameter than roller 21, the area of surface contact of the conveyor belt and layer of sludge is greater about roller 19 than it is about roller 21. Therefore, the layer of sludge will be squeezed tighter as it moves about roller 21 than as it moves about roller 19. In the embodiment illustrated, roller 19 is approximately 40 inches in diameter and roller 21 is approximately 2 feet in diameter and the third conveyor belt extends about approximately 240° about each roller, and with approximately 4,000 pounds per foot in width tension in the belt, adds approximately 575 pounds per square foot squeezing force about roller 19 and approximately 950 pounds per square foot squeezing force about roller 21. The sludge is therefore progressively squeezed tighter as it moves progressively about rollers 19 and 21. Therefore, the section of the system which includes the rollers 18–22 and the high tension third belt 38 comprises a high pressure dewatering section.

When the first and second conveyor belts 11 and 25 pass about guide roller 29, the second conveyor belt 25 moves at an angle in a downward direction away from the first conveyor belt. Air nozzle 71 is located just beyond guide roller 29 and directs a flow of air against and through first conveyor belt 11 and urges the sludge cake downwardly away from the first conveyor belt 11, so that the sludge cake tends to continue to move with the second conveyor belt 25. Thus, both the flow of air and the force of gravity tend to urge the sludge cake to continue to move with the second conveyor belt.

The sludge cake and second conveyor belt move about guide roller 30 to position the sludge cake below the belt and air nozzle 72 is located adjacent guide roll 30 and functions to direct a flow of air in a downward direction against and through second conveyor belt 25. Air nozzle 72 is located adjacent and on the down stream side of guide roll 30, so that as the sludge cake and second conveyor belt move about guide roll 30, the sludge cake tends to expand and crack, causing the sludge cake to separate from itself and from the second conveyor belt, and the flow of air through the second conveyor belt as well as the force of gravity tend to urge the sludge cake downwardly away from the second conveyor belt, where the sludge cake falls into a receptacle 74.

Air nozzles 75 and 76 are located downstream from nozzles 71 and 72, and air nozzles 75 and 76 direct a flow of air against and through the conveyor belts 11 and 25. A pressure gauge (not shown) is in communication with the air nozzles 75 and 76, and when excessive material is present on or blocks the pores of either or both of the conveyor belts 11 and 25, the pressure in the air nozzles 75 and 76 will increase, which indicates that the porosity of the belts has decreased. In response to the increasing pressure or decreasing porosity, an electrical circuit (not shown) opens a valve in the conduit communicating with nozzles 78 and 79. Nozzles 78 and 79 receive a flow of air under pressure and water from the chamber 63, and the air flow functions as a jet pump to propel the water against the conveyor belt. The rapidly moving air and water tend to open the pores of the conveyor belt. Thus, the nozzles 75, 76, 78 and 79 together with their pressure sensing and actuating means function as an intermittently-actuated belt cleaning system which is initiated in response to a decrease in porosity of the belts.

When the sludge is eventually deposited on the first conveyor belt 11, the sludge is allowed to settle on the conveyor belt and to drain first in the first chamber 58. As the sludge continues to move with the first conveyor belt, no bending of the belt or compression of the sludge is created by external forces, but the progressively increasing vacuum applied to the lower surface of the upper run of the first conveyor belt tends to gently expedite the removal of the liquid substantially without disturbing the solids of the sludge. When the sludge eventually reaches the second conveyor belt 25, the sludge is progressively compressed at the end of its movement up the incline of the upper run of the first conveyor belt, and then the sludge passes over the highest vacuum chamber in a sandwiched relationship between the first and second conveyor belts prior to reaching the dewatering drum 16. When the sandwiched belts and sludge begin their travel about the dewatering drum, the sludge is put in slight compression, between approximately 3.8 and 7.7 pounds per square foot, and the large diameter of the dewatering drum and the relatively low tension in the outer second conveyor belt 25 tends to gently squeeze the layer of sludge and to maintain the layer of sludge in this gentle squeezing action for a substantial length of time as the sludge moves about the large dewatering drum. When the sludge moves about the first of the smaller rollers 18, it is squeezed at approximately 16 and 33 pounds per square foot. When the sludge moves about rollers 19 and 21 it is squeezed by both belts 25 and 38 at approximately 585 and 970 pounds per square foot respectively. Therefore, it can be seen that the sludge is progressively squeezed tighter as it passes on through the system.

The belts 11 and 25 can be driven by any of the rollers 18–22 or by dewatering drum 16 and a drive system (not shown) rotates one of the rollers or drum. The high tension belt 38 is driven by its contact with belt 25. The speed of the belts is maintained between 3 and 20 feet per minute.

Since the vacuum applied to the sludge in the chambers 59–63 pulls a substantial amount of the water from the sludge prior to the squeezing actions at the dewatering drum, the sludge is substantially stable prior to reaching the drum and rollers 18–22 so that the squeezing of the sludge will not force the smaller solids through the filter belt.

FIG. 2 shows a modified slurry feed system which includes slurry feed conduits 84 and 85, both of which feed the slurry to the moving filter belt 11 in the pan 51. Conduit 84 deposits the sludge on the belt 11 through discharge openings 86 and 87 and conduit 85 deposits its sludge on the belt through discharge opening 88. The sludge moving through conduit 84 is treated with a flocculent at a prior flow position (not shown), while the sludge moving through conduit 85 is untreated. With this arrangement, the discharge opening 86 deposits a first layer of treated sludge on the belt, the first layer of sludge and the belt move to the second discharge opening 88 where the discharge opening 88 deposits a second or untreated layer of sludge into and on the first layer. Finally, discharge opening 87 deposits a layer of treated sludge into and on the first and second layers. The flocculent of the first and third layers of sludge mix with the untreated layer so that a flocculent for the second layer can be omitted at substantial savings. Moveover, the higher subatmospheric pressure at the beginning of the upper run is more effective on the thinner layer of sludge and allows the first layer to be dewatered to some extent and function as part of the filter media for the subsequent layers of sludge.

FIG. 3 illustrates a modified high pressure dewatering section of the invention, wherein two high tension belts are used in the high pressure dewatering section. Belt 90 is similar to belt 38 in the embodiment illustrated in FIG. 1 in that it moves upwardly from roller 91 in the direction indicated by arrow 92 over the upper arc of roller 94 and beneath the filter belts, then downwardly about the lower arc of roller 95 and about the filter belts, then alternately over and under the rollers 96, 97, 98 and 99, alternately between the rollers and the belts and about both the rollers and the belts. A second tension belt 100 moves in a downward direction from guide roller 101 as indicated by arrow 102 and then alternately about the lower and upper arcs of rollers 95, 96, 97, 98 and 99. The tension in belts 90 and 100 is adjusted by the fluid actuated rams 90a and 100a, by the rams exerting a constant force to the rollers 91 and 103. The arrangement of FIG. 3 causes a high tension belt to be located outside the filter belts on each of the drums 95–99.

Roller 94 is 12 inches in diameter, roller 95 is 48 inches in diameter, roller 96 is 36 inches in diameter, roller 97 is 36 inches in diameter, roller 98 is 24 inches in diameter, and roller 99 is 24 inches in diameter. The tension applied to belt 90 is slightly more than the tension applied to belt 100.

When the filter belts move from the large diameter dewatering drum 89 onto the smaller roller 94, the smaller diameter of the roller 94 in combination with the same tension in the filter belts throughout the system causes more squeezing force to be applied to the sludge about roller 94 than about the dewatering drum. When the sludge and filter belts reach roller 95, the high tension belt 90 will be located outside the sludge and filter belts, so that additional squeezing forces are applied to the belts and sludge as they travel about the lower arc of roller 95. When the belts and sludge travel about the upper arc of roller 96, the high tension belt 100 will be located outside of the belts and sludge, so as to apply squeezing force to the sludge. The smaller diameter of roller 96 causes the tension in the belt 100 to apply substantial squeezing forces to the sludge. As the belts move about the lower arc of roller 97, the belt 90 in combination with the smaller diameter roller 97 exerts more squeezing force than was exerted about roller 95. In addition, the higher tension in belt 90 than in belt 100 causes more squeezing forces to be applied about the lower arc of roller 97 than about the upper arc of roller 96. When the belts move about the upper arc of the smaller roller 98, the smaller diameter of that roller causes an increase in the squeezing forces to be applied to the filter belts and sludge. Thus, it can be seen that progressively higher squeezing forces are applied to the sludge by both disclosed embodiments.

While the disclosed embodiment of the invention sets forth a sludge dewatering system, it will be understood by those skilled in the art that the same or similar systems can be used to dewater other flowable aqueous materials. Moreover, while particular sizes and tensions have been disclosed with regard to the rollers and belts, it will be understood that these and other forms and features of the particular embodiments of the invention are by way of illustration only, and are meant to be in no way restrictive; therefore, numerous changes and modifications may be made and the full use of equivalents resorted to without departing from the spirit or scope of the invention as defined in the appended claims.

We claim:

1. Apparatus for dewatering flowable aqueous material or the like comprising a first endless porous belt movable along its length through an upper flight toward a rotatable dewatering drum, then through a downward arc around a portion of said dewatering drum, then through a lower return flight in a sinuous path in sequence around the arcuate upper and lower surfaces of a series of rollers, feed means for depositing flowable aqueous material on the upper surface of said first belt at a first position along the upper flight, a second endless porous belt movable along its length toward said dewatering drum into sandwiched relationship with said first endless belt about the material and movable with said first endless belt along the upper flight of said first endless belt toward said dewatering drum and around a portion of said dewatering drum and around the arcuate upper and lower surfaces of said series of rollers, and a third endless belt means movable into sandwiched relationship with said first and second endless belts and the material carried by said first and second endless belts as the first and second endless belts move along the lower return flight for urging the first and second endless belts and the material carried thereby in compression against the surfaces of the series of rollers of said plurality of rollers as said first and second endless belts move through the lower return flight, means for applying tension to said third endless belt means, said third endless belt means and said plurality of rollers being arranged to apply progressively increased pressures to the sandwiched first and second belts and the material carried thereby as the first and second endless belts move around subsequent ones of the series of rollers in the return flight.

2. The apparatus of claim 1 and wherein the diameter of a first one of the rollers of said series of said rollers about which said third endless belt means moves is larger than the diameter of a subsequent one of said rollers of said series of rollers about which said third endless belt means moves, whereby the material moving about the rollers is squeezed with more pressure as it passes about said smaller diameter subsequent one of said rollers.

3. The apparatus of claim 1 and wherein said first belt is movable up an incline as it moves along its upper flight.

4. The apparatus of claim 1 and wherein said first and second endless belts are movable apart after moving about said plurality of rollers, and further including first means for urging the material to move in a downward direction away from said first endless belt to separate from said first endless belt and to continue to move with said second endless belt as the first and second endless belts move apart from each other, and second means for urging the material to move in a downward direction away from said second endless belt to separate from the second endless belt.

5. The apparatus of claim 4 and wherein said first and second means for urging the material comprises means for directing a flow of air against and through said first and second endless belts.

6. The apparatus of claim 1 and further comprising means for detecting the porosity of said first and second endless belts, and means responsive to the detection of low porosity of said belts for directing a flow of fluid through said belts.

7. Apparatus for dewatering a flowable aqueous material and the like comprising a first endless belt movable along its length first through an approximately horizontal upper run, then through a downward arc about a dewatering drum and then through a lower return run in sequence about a series of rollers, feed means for depositing a flowable aqueous material and the like on the upper surface of said first endless belt at a first position along the upper run, a second endless belt movable along its length toward said dewatering drum and into overlying relationship with the material and said first endless belt as first endless belt moves along its upper run to hold the material between said first and second endless belts as said belts move toward said dewatering drum and movable with the material and said first endless belt about said series of roller along the lower return run, a third endless belt movable along its length into overlying relationship with and on one side of said first and second endless belts as said first and second endless belts move in sequence about said series of rollers along the lower return run whereby said third endless belt moves on the outside of said first and second endless belts and the material carried thereby and around arcs of at least two of said rollers, the diameters of said at least two of said rollers being progressively smaller from one roller to the next, means for applying tension to said third endless belt whereby progressively more pressure is applied to the material between said first and second endless belts as the material passes in sequence around arcs of said at least two of said rollers, a fourth endless belt movable along its length into overlying relationship with and on the other side of said first and second endless belts from said third endless belt as said endless belts move in sequence about said series of rollers along the lower return run whereby said fourth endless belt moves on the outside of said first, second and third endless belts and the material carried thereby and around arcs of at least two others of said rollers, the diameters of said at least two others of said rollers being progressively smaller from one roller to the next, and means for applying tension to said fourth endless belt whereby progressively more pressure is applied to the material between said first and second endless belts as the material passes in sequence around arcs of said at least two others of said rollers.

8. Apparatus for dewatering a flowable aqueous material or the like comprising a first endless belt movable along its length through an upper run, and then through a downward arc about a dewatering drum, and then through a lower return run in a sinuous path in sequence about a plurality of rollers with the diameters of at least two of the rollers being smaller from one roller to the next, feed means for depositing flowable aqueous material on the upper surface of said first belt along its upper run, a second endless belt movable into sandwiched relationship with said first endless belt about the material as said first endless belt moves along its upper run and then movable with said first endless belt about said dewatering drum and in sequence about said plurality of rollers, and a third belt movable over the sandwiched first and second endless belts in sequence around arcs of said at least two of the rollers of said plurality of rollers for squeezing the sandwiched first and second endless belts together about the material carried by said first and second endless belts throughout the movement of the endless belts about the arcs of the surfaces of said at least two of the rollers of said plurality of rollers with progressively increasing pressure for subsequent ones of said at least two of the rollers and substantially without imparting tension to said first and second endless belts.

9. Apparatus for dewatering a flowable aqueous material or the like comprising a first endless woven fiber belt movable along its length through an upper run, and then through a downward arc about a dewatering drum, and then through a lower return run in a sinuous path in sequence about a plurality of rollers with the diameters of at least some of the rollers being smaller from one roller to the next, feed means for depositing flowable aqueous material on the upper surface of said first belt along its upper run, a second endless woven fiber belt movable into sandwiched relationship with said first endless belt about the material as said first endless belt moves along its upper run and then movable with said first endless belt about said dewatering drum and in sequence about said plurality of rollers, and a woven steel belt movable with said first and second belts through the lower return run in the sinuous path about the plurality of rollers and means for applying tension to said woven steel belt whereby the woven steel belt squeezes the sandwiched first and second endless belts together about the material carried by said first and second endless belts throughout the movement of the endless belts about the arcs of the surfaces of said at least some of the rollers of said plurality of rollers with progressively increasing pressure for subsequent ones of said at least some of the rollers and substantially without imparting tension to said first and second endless belts.

10. Apparatus for dewatering a flowable aqueous material or the like comprising a first endless belt movable along its length through an upper run, and then through a downward arc about a dewatering drum, and then through a lower return run in a sinuous path in sequence about a plurality of rollers, feed means for depositing flowable aqueous material on the upper surface of said first belt along its upper run, a second endless belt movable into sandwiched relationship with said first endless belt about the material as said first endless belt moves along its upper run and the movable with said first endless belt about said dewatering drum and in sequence about said plurality of rollers, and a third belt movable over the sandwiched first and second endless belts and around arcs of said at least two of the rollers of said plurality of rollers for squeezing the sandwiched first and second endless belts together about the material carried by said first and second endless belts throughout the movement of the endless belts about the arcs of the surfaces of at least some of the rollers of said plurality of rollers with progressively increasing pressure for subsequent ones of the rollers and substantially without imparting tension to said first and second endless belts.

11. The apparatus of claim 10 and further including means for applying constant tension to said third belt.

* * * * *